R. LEUMANN.
CONVEYING MECHANISM.
APPLICATION FILED JULY 1, 1919.

1,336,304.

Patented Apr. 6, 1920.
3 SHEETS—SHEET 1.

Inventor:
Richard Leumann
By Henry Orth
Atty.

R. LEUMANN.
CONVEYING MECHANISM.
APPLICATION FILED JULY 1, 1919.
1,336,304.
Patented Apr. 6, 1920.
3 SHEETS—SHEET 2.
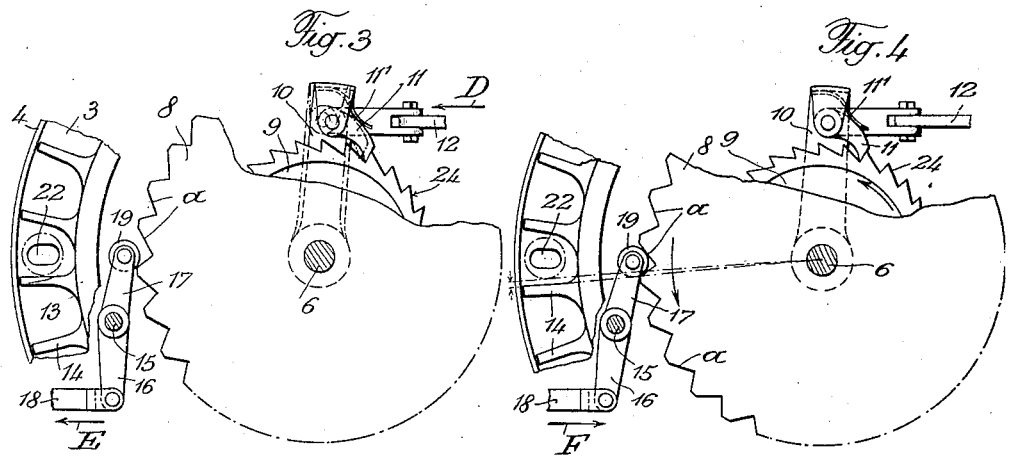
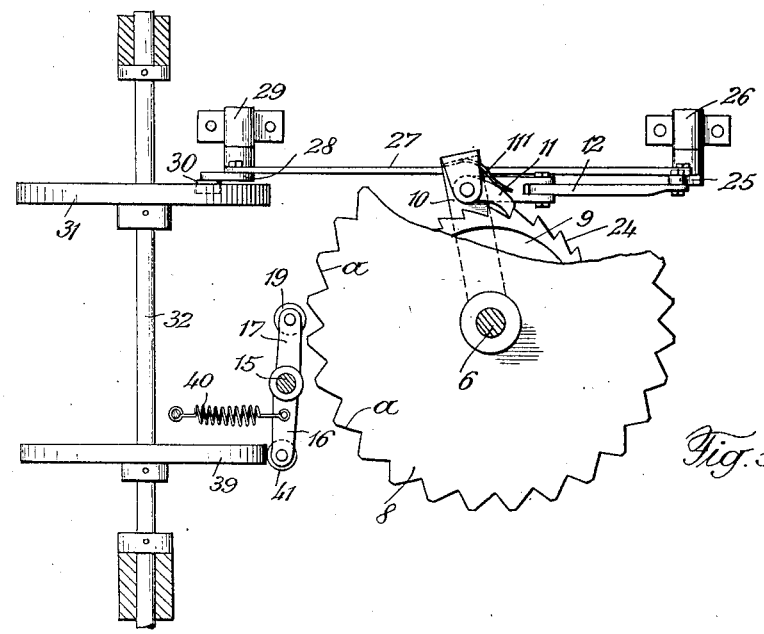
Inventor:
Richard Leumann
By Henry Orth
atty

UNITED STATES PATENT OFFICE.

RICHARD LEUMANN, OF CHAILLY-SUR-LAUSANNE, SWITZERLAND.

CONVEYING MECHANISM.

1,336,304.   Specification of Letters Patent.   Patented Apr. 6, 1920.

Application filed July 1, 1919. Serial No. 308,045.

*To all whom it may concern:*

Be it known that I, RICHARD LEUMANN, a citizen of the Republic of Switzerland, residing at Villa "La Loex," Chailly-sur-Lausanne, Switzerland, have invented certain new and useful Improvements in Conveying Mechanism; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in conveying mechanism comprising a member provided with cups or recesses separated from one another by ribs and adapted to receive articles to be conveyed, and means for imparting to said member an intermittent forward feed movement in order to bring said articles within the range of members adapted to lift an article from the conveying member and replace it into the latter after a certain span of time.

In mechanism of this type, it frequently occurs that the articles are so moved relatively to the ribs of the conveying member when they are outside of its cups, that upon being replaced into this member they are caused to strike against its ribs. In consequence of this, the articles or their wrappers, in case that they are inclosed in a wrapper, are easily injured.

In order to prevent such a striking of the articles against the ribs of the conveying member when they are replaced into the latter, the intermittently moved conveying member receives in a mechanism according to this invention a small backward movement at the end of each forward feed movement.

This invention will now be more particularly described with reference to the accompanying drawings illustrating by way of example one construction for carrying out the invention. In these drawings:

Figs. 3 and 4 illustrate the feed element of the conveying-mechanism in different working positions.

Fig. 5 shows a modification of the means for reversely moving the conveying disk and Fig. 6 is a section through a part of the wrapping machine shown in Figs. 1 and 2 illustrating the mechanism for actuating the pistons adapted to move the articles from the conveying disk and replace them into the latter after a certain interval of time.

Figures 1, 2:
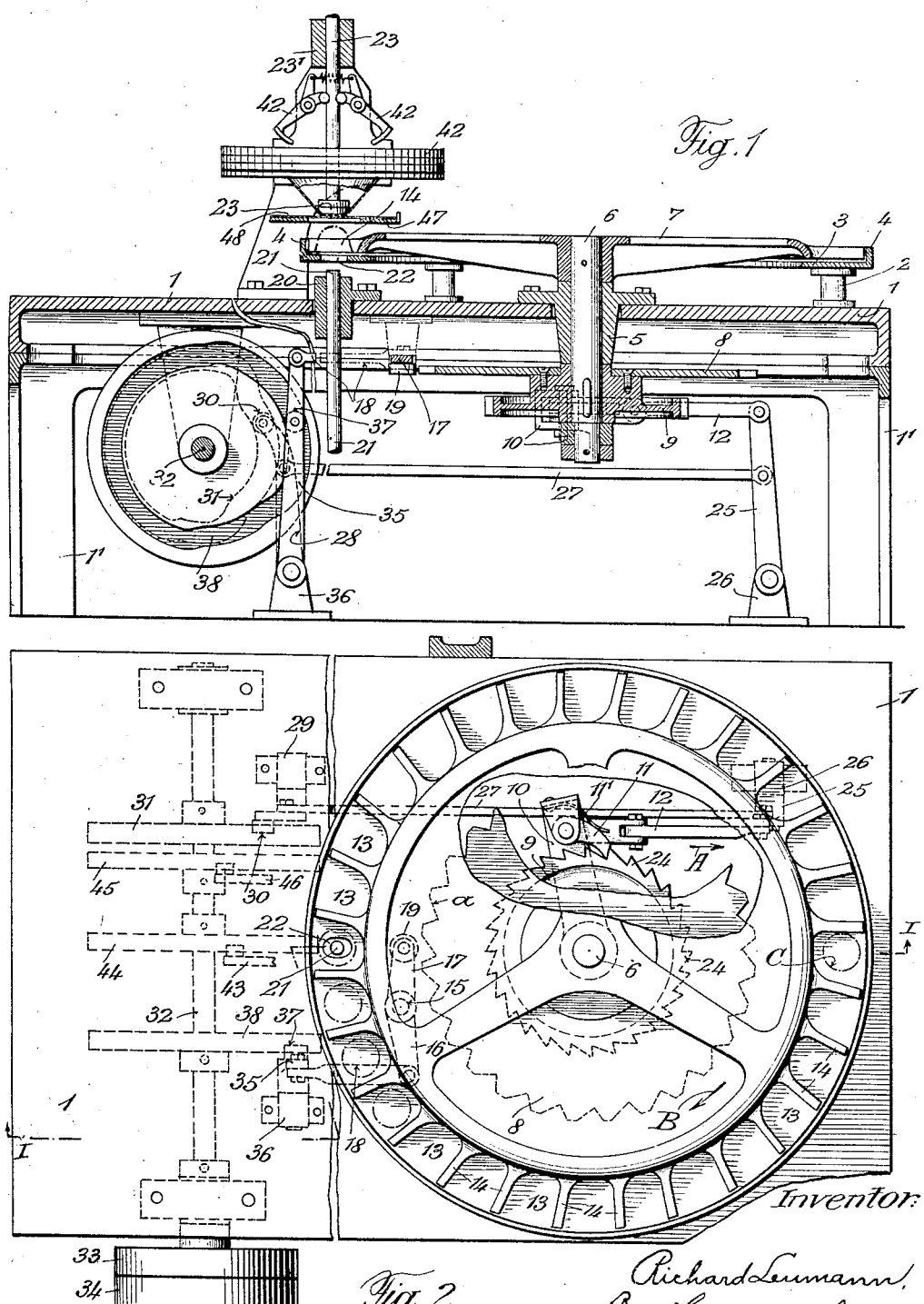
Figure 1 is a vertical cross-section on the line I—I of Fig. 2 through a machine for wrapping single articles, such as chocolate bonbons and other single sweets in a wrapper fitted with the novel conveying mechanism, some parts of the wrapping mechanism proper being omitted.
Fig. 2 is a plan view corresponding to Fig. 1, some parts of the wrapping mechanism being also omitted.

Referring to the drawings, 1 denotes a plate fixed to the frame $1^1$ of the wrapping machine to which the improved conveying mechanism is applied. 3 designates a ring-shaped plate resting on a bolt 2 supported by the plate 1 and provided with an upward extending flange 4. The plate 1 carries a bearing 5 in which is rotatably mounted a shaft 6. To one end of this shaft 6 is fixed a conveying disk 7, while to the other end are fixed a ratchet wheel 8 and a feed wheel 9.

10 designates an arm loose on the shaft 6 and having a fork-shaped end. This end of the arm 10 carries a pivotally mounted pawl 11 acted upon by a spring $11^1$, and a guide rod 12. The latter is connected to a one armed lever 25 pivotally mounted in a stationary support 26. To the lever 25 is also fixed a rod 27 connected to a one armed lever 28 pivotally mounted in a stationary support 29 (Fig. 2) and carrying at its free end a roller 30 running in a groove of a cam disk 31 fixed to a driving shaft 32, which carries a fast pulley 33 and a loose pulley 34.

The conveying disk 7 is provided with cups or recesses 13 adapted to receive the articles to be conveyed. The cups 13 are separated from one another by ribs 14 which are slightly inclined in a radial direction. The dimension of the cups 13 measured in the feed direction of the disk 7 is greater than the dimension of the articles to be wrapped measured in the same direction.

To the plate 1 is also rigidly connected a bolt 15 (Figs. 2–4) on which is loosely mounted a double armed lever 16, 17 adapted to act as a locking member. To the arm 16 of this lever is pivotally attached a rod 18 connected to a one armed lever 35 pivotally mounted in a stationary support 36. The lever 35 carries a roller 37 running in a groove of a cam disk 38 fixed to the driving shaft 32. The arm 17 of said lever 16, 17 carries a roller 19.

Figure 6:
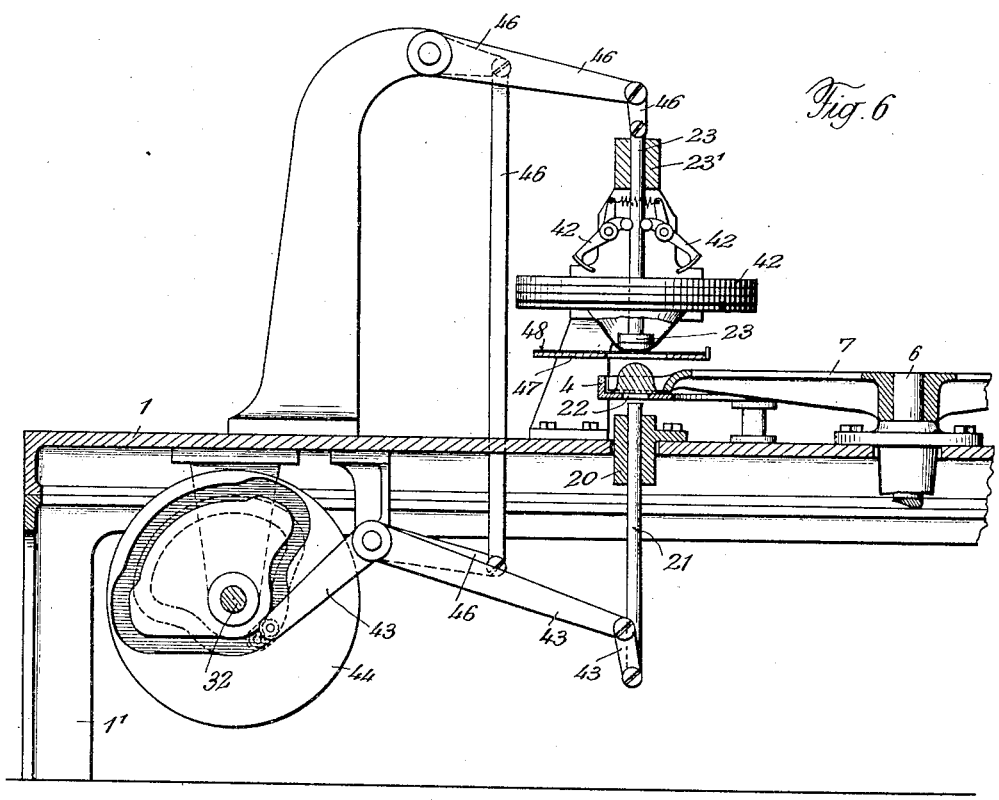

The plate 3 has an aperture 22 for the passage therethrough of a piston 21 which moves up and down in a vertical guide 20 fixed to the plate 1. A second piston 23 is adapted to coöperate with the piston 21; it moves up and down in a fixed vertical guide $23^1$ situated above the disk 7. The two pistons 21 and 23 serve to lift the bonbons from the disk 7 and to bring them within the range of a wrapping mechanism 49 of the wrapping machine, and they receive their motion through members 43 and 46 respectively (Fig. 6) from two cams 44 and 45 respectively, fixed to the shaft 32. A table 47 provided with an aperture for the passage therethrough of the bonbons is arranged directly over the disk 7. Sheets 48 consisting for instance of tin foil, paper, etc., intended to serve as the wrappers, are brought upon the table 47 in regular intervals of time by means of any known devices not shown in the drawings. The piston 23 is adapted to actuate the wrapping mechanism 49 referred to; this mechanism is of the kind described in my British Patent Specification 110,882, and as this mechanism has nothing to do with the present invention, I shall not describe it here.

The number of teeth 24 of the feed wheel 9 corresponds to the number of cups or recesses 13 of the disk 7 and also of the number of ribs 14 of this disk 7 and the ratchet wheel 8 has the same number of teeth as the feed wheel 9. Each tooth of the ratchet wheel 8 is provided with a surface which is slightly inclined in the radial direction of the feed wheel 9 and with which is adapted to coöperate the roller 19 already refered to.

The operation of the conveying mechanism hereinbefore described and as shown in the drawings is as follows:

The articles to be wrapped, for instance bonbons are so inserted by hand or mechanically at a determinate point of the feed disk 7, for instance at C, into a cup 13 that they abut against the forward edge (seen in the feed direction) of a rib 14. Upon a movement of the rod 12 in the direction of the arrow A (Fig. 2) the pawl 11 turns the feed wheel assuming the position illustrated in Fig. 2—which position corresponds to the position of the members at the beginning of the forward feed movement of the disk 7—by an angular amount that is a little greater than that which would be imparted to the feed wheel 9 upon an angular rotation of the latter by an amount corresponding to the angle of a single tooth. In consequence of this, the disk 7 is also rotated in the direction of the arrow B by an angular amount which is greater than that by which said disk 7 would be rotated upon receiving a feed movement corresponding to the distance between the leading edges (seen in the feed direction) of two adjacent ribs 14. At the beginning of the forward feed movement of the disk 7, the bonbons resting on the plate 3 and of which only three are shown in the drawings, assume the positions shown in Fig. 2 in point and dash lines. As shown, only the bonbon just inserted at C into one of the cups 13 is in contact with the leading edge of a rib 14, while the other pieces, which have been fed forward during the previous feed movements imparted to the disk 7, are resting on the plate 3, at a certain distance from the ribs 14. At the beginning of the forward feed movement of the disk 7, the double armed lever 16, 17 and the slide roller 19 assume the position of rest in which they admit a movement of the ratchet wheel 8 past them.

When a movement is imparted to the disk 7, the bonbon inserted at C into a cup 13 is immediately moved forward by the rib 14 against which it abuts, while the other pieces are only moved forward upon their coming in contact with the ribs 14.

At the end of the forward feed movement, the members of the conveying mechanism and the bonbons assume the position shown in Fig. 3 in full lines, the roller 19 having been moved in the course of said movement slightly toward the center of the wheel 8. While the disk 7 remains now stationary, the pistons 21, 23 are moved so as to be caused to lift the bonbon situated just above the aperture 22 from the disk 7 and bring it within range of the wrapping mechanism. At the same time the rod 12 is moved by a small amount in the direction of the arrow D (Fig. 3) so that the pawl 11 is caused to assume the position shown in Fig. 3 in dotted lines. In this position of the pawl 11, the latter is situated at a certain distance from the working surface of the adjacent tooth of the feed wheel 9, while the slide roller 19 coöperates with the working surface of a tooth of the ratchet wheel 8. While the rod 12 remains now stationary, the rod 18 is rocked by a further amount in the direction of the arrow E (Fig. 3) so that the roller 19 coöperating with the working surface of a tooth of the ratchet wheel 8 causes a rotation of the wheels 8 and 9 in the sense of the arrows shown in Fig. 4. As a result of this, the working surface of a tooth of the feed wheel 9 is again brought into engagement with the pawl 11. The rotation of the wheels 8, 9 in the direction of the arrows shown in Fig. 4 has the effect to rotate the conveying disk 7 a small amount backward (shown in Fig. 4 in point and dash lines), so that it is moved relatively to that bonbon which in the meantime has been wrapped up and is then replaced into the cup 13 of the disk 7 just situated over the aperture 22 by the piston 21. In consequence of said backward movement imparted to the disk 7, any striking of the bonbons against the ribs 14 when they are replaced into the cups 13 is avoided.

Upon a movement of the rod 18 in the direction of the arrow F (Fig. 4) and of the roller 19 into the position shown in Fig. 2, the different members of the feed- and conveying mechanism and the bonbons are again caused to assume the position illustrated in Fig. 2 in which they are ready for the next forward feed-movement.

In the construction illustrated in Fig. 5, the arm 16, 17 is not acted upon by a rod 18 but by a spring 40 having the tendency to move the roller 19 toward the ratchet wheel 8 and a roller 41 carried by the arm 16 toward a cam disk 39 fixed to the driving shaft 32. The spring 40 is adapted to impart to the wheels 8, 9 and to the disk 7 a backward movement when the pawl 11 has been moved backward, the design of the cam disk 39 being such that the roller 19 is kept at a certain distance from the surface $a$ of the teeth of the wheel 8 when the disk 7 is moved forward.

I claim:

1. A conveying mechanism of the character described, comprising a conveying member provided with cups adapted to receive articles to be conveyed and separated from one another by ribs, means adapted to impart to said member an intermittent forward feed movement, means adapted to move an article from said conveying member and replace it into the latter after a certain interval of time, and means adapted to impart to the conveying member a backward movement in order to prevent the articles from striking against the ribs of the cups when they are replaced into the latter.

2. A conveying mechanism of the character described, comprising a conveying disk provided with cups adapted to receive articles to be conveyed and separated from one another by ribs, a shaft carrying said disk, a toothed wheel fixed to said shaft, the number of teeth of said wheel corresponding to the number of cups of the disk, means adapted to impart to said disk a rotary forward feed movement, a second toothed wheel also fixed to said shaft and having the same number of teeth as said first mentioned toothed wheel, a locking member coöperating with the second toothed wheel, means adapted to move an article from said disk and replace it into the latter after a certain interval of time, and means adapted to move said locking member at the end of each forward feed movement of the disk for the purpose of moving the latter backward in order to prevent the articles from striking against the ribs of the cups when they are replaced into the latter.

3. A conveying mechanism of the character described, comprising a conveying disk provided with cups adapted to receive articles to be conveyed and separated from one another by ribs, a shaft carrying said disk, a toothed wheel fixed to said shaft, the number of teeth of said wheel corresponding to the number of cups of the disk, means adapted to impart to said disk a rotary forward feed movement, a ratchet wheel also fixed to said shaft and having the same number of teeth as said first mentioned toothed wheel, a pivotally mounted lever, a slide roller carried by said lever and adapted to coöperate with the working surface of the teeth of the ratchet wheel, means adapted to move an article from said disk and replace it into the latter after a certain interval of time, and means adapted to rock said lever at the end of each forward feed movement of the disk for the purpose of moving the latter backward.

4. A conveying mechanism of the character described, comprising a conveying disk provided with cups adapted to receive articles to be conveyed and separated from one another by ribs, a shaft carrying said disk, a toothed wheel fixed to said shaft, the number of teeth of said wheel corresponding to the number of cups of the disk, means adapted to impart to said disks a rotary forward feed movement, a ratchet wheel also fixed to said shaft and having the same number of teeth as said first mentioned toothed wheel, a pivotally mounted lever, a slide roller carried by said lever and adapted to coöperate with the working surface of the teeth of the ratchet wheel, means adapted to move an article from said disk and replace it into the latter after a certain interval of time, a cam disk, and means operatively connecting the cam disk to said pivotally mounted lever, the cam disk being adapted to rock said lever at the end of each forward feed movement of the disk for the purpose of moving the latter backward and prevent the imparting of a forward feed-movement to the disk.

5. A conveying mechanism of the character described, comprising a conveying member provided with cups for receiving the article to be conveyed, a pawl and ratchet mechanism for stepping the conveying members through the space of a cup at each movement of said pawl and ratchet mechanism including means to partially retract the pawl and mechanism to positively reverse said member an amount equal to the retraction of said pawl.

In testimony that I claim the foregoing as my invention I have signed my name.

RICHARD LEUMANN.

Witnesses:
EUGENE KAUSE,
EMILE GIDDEY.